Oct. 16, 1951 S. D. RUSSELL 2,571,489
BALING MACHINE WITH SPIRAL FEEDING
AND COMPRESSION MEANS
Filed June 16, 1944 2 Sheets-Sheet 2

Inventor:
Stanley D. Russell,
By Soans, Pond & Henderson
Attorneys.

Patented Oct. 16, 1951

2,571,489

UNITED STATES PATENT OFFICE 2,571,489

BALING MACHINE WITH SPIRAL FEEDING AND COMPRESSION MEANS

Stanley D. Russell, Racine, Wis., assignor to J. I. Case Company, Racine, Wis., a corporation of Wisconsin Application June 16, 1944, Serial No. 540,560

3 Claims. (Cl. 100—25)

This invention relates to baling machines, particularly of the type constructed for baling cured gramineous products for subsequent use with stock, as for example hay for feed and straw for bedding, or for baling stalks or other vegetation for commercial use. More particularly, the invention relates to the type of baling machine which is drawn along the field and picks up the cured material and delivers it to a feeding mechanism by which it is advanced into the baling chamber where, in turn, it is compressed and tied into bales.

In machines of this type, the formation of even and uniformly compressed bales is dependent very much upon a feeding mechanism capable of conveying the material continuously and regularly to the baling chamber so that between each reciprocation of the compression plunger practically equal amounts of material are advanced into the baling chamber. Moreover, it is advantageous that the material, as it approaches the opening into the baling chamber, receives a preliminary compression.

Heretofore, one of the more generally used means for feeding the picked-up material to the baling chamber has been a conveyer belt extending out from and moving transversely to the baling chamber. In order to accomplish the preliminary compression of the material approaching the opening into the baling chamber, it has been necessary to supplement the conveyer belt with a gravity-actuated positively-driven feed drum located adjacent to the opening into the baling chamber, such as shown in Russell Patent No. 2,362,861, of November 14, 1944. This arrangement has been found to have its limitations in accomplishing the desired uniform feeding of the material to the baling chamber and also the proper preliminary compression of the material as it is prepared for delivery into the baling chamber.

The main objects of this invention, therefore, are to provide an improved spiral feeding means for receiving the material to be baled and advancing it toward and effecting a compression thereof preliminary of its delivery into the baling chamber; and to provide an improved form and arrangement of a spiral feeding mechanism which is simple and economical in construction and highly efficient in operation.

In the specific embodiment of the invention herein shown,

Figure 1:
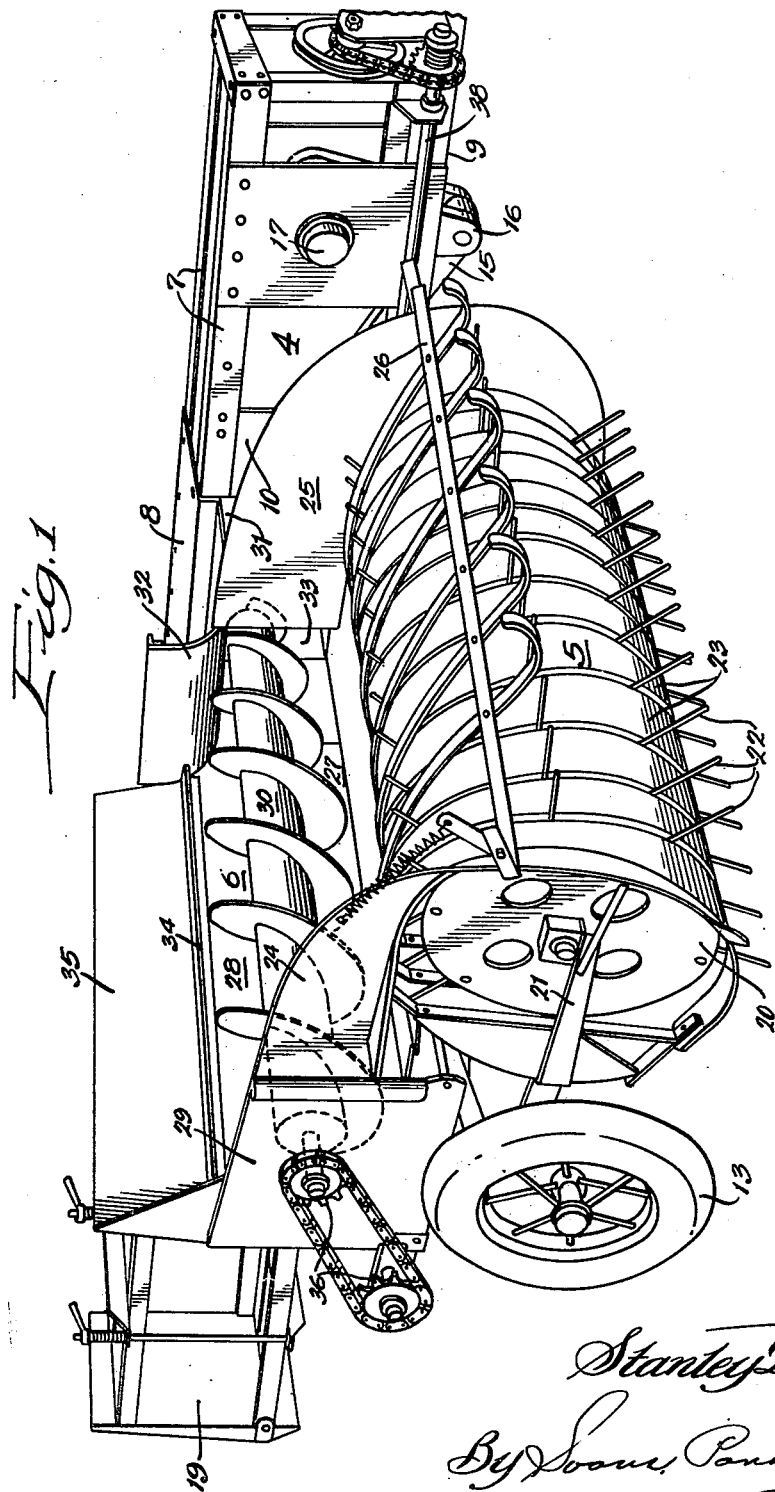
Figure 1 is a front perspective view of a baling machine equipped with a spiral feeding mechanism constructed in accordance with this invention.
Figure 2:
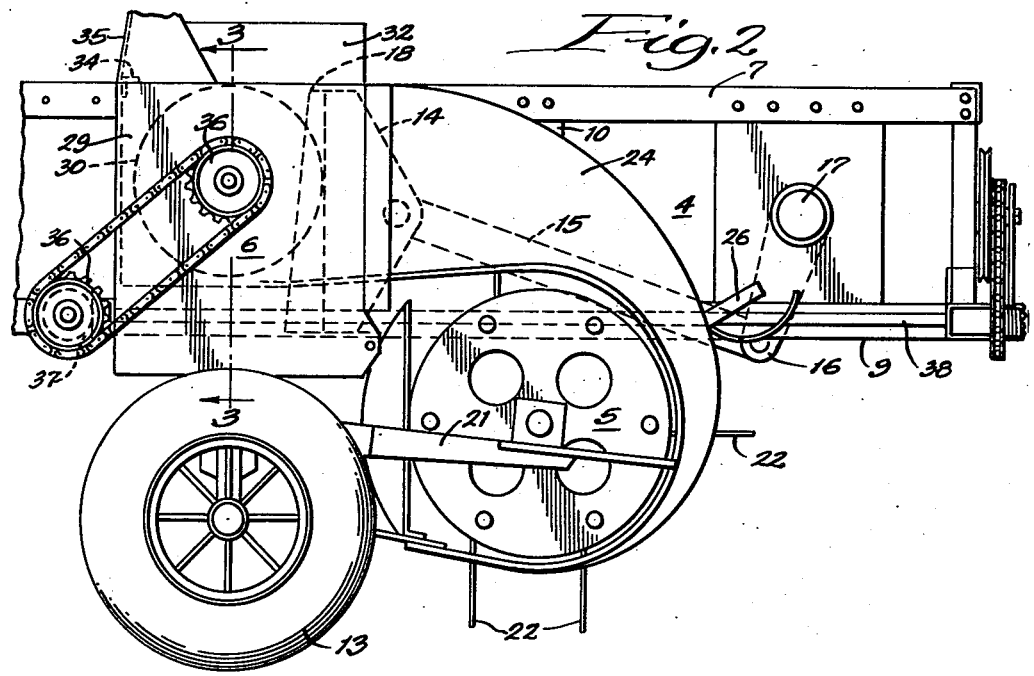
Figure 2 is an end elevational view of such baling machine taken from the left of Figure 1.

A baling machine equipped with a spiral feeding mechanism embodying this invention comprises the usual baling means 4, a well-known type of pick-up mechanism 5, and the improved feeding mechanism 6 all associated so that as the machine is drawn over the field, the material to be baled is picked up by the mechanism 5, received by the feeding mechanism 6, and advanced to the baling mechanism 4 where it is compressed and tied into bales and discharged a bale at a time onto the field.

The baling means 4 comprises an elongated fabrication of angle bars 7 secured together at their ends by angle plates and intermediately by top, bottom, and side plates 8, 9, and 10, respectively, so as to form a baling chamber 11 of rectangular cross-section. One of the side plates 10 has an opening 12 formed therein providing communication between the baling chamber 11 and the feeding mechanism 6. An auxiliary framework secured to this fabrication and extending transversely out from one side thereof provides support for the pick-up mechanism 5 and feeding mechanism 6. Wheels 13 are suitably mounted on the fabrication and the auxiliary framework whereby the machine is made portable in the direction of the longitudinal dimension of said baling means.

A plunger 14 is reciprocatingly mounted in the baling chamber 11, being connected by means of a pitman 15 to a crank 16 attached to a shaft 17 journaled at the forward end of the fabrication and suitably connected to a source of power, not shown. A knife 18 is mounted at the inner edge of the plunger 14 in advance of the plunger face so as to sever the material entering the baling chamber 11 each time the plunger moves forward to compress an already-delivered quantity of the material.

Rearwardly of the opening 12 is a suitable means (not herein shown) for permitting the insertion and tying of wires around the baled material as it moves toward the far end of the baling means 4 preparatory to its discharge from the end gate 19.

The pick-up mechanism herein shown comprises a drum 20 journaled on arms 21 (one of which is shown in the figures) which constitute a part of the auxiliary framework hereinbefore mentioned. The drum 20 carries circumferentially arranged rows of fingers 22 which extend outwardly between the series of stripper sections 23 supported on said auxiliary frame between the flare sheets 24 and 25. Associated with this pick-up mechanism is the usual wind guard 26.

The improved form of feeding mechanism 6 embodying this invention comprises a receiving trough formed by a bottom member 27, a back member 28, and an end member 29 wherein is rotatably mounted the spiral member 30.

The bottom, back, and end members 27, 28, and 29 are appropriately secured together and mounted on the auxiliary frame hereinbefore referred to and attached to the angle bars 7 of the baling mechanism 4 directly opposite and in horizontal alignment with the opening 12 into the baling chamber 11. The front of this receiving trough is open and the stripper sections 23 and the flare sheets 24 and 25 are attached to the aforesaid parts so that the material from the pick-up mechanism 5 is delivered to the receiving trough.

Between the flare sheet 25 of the pick-up mechanism 5 and the framework of the baling mechanism 4, there is arranged an auxiliary side piece 31 and top piece 32, the latter of which curves outwardly and upwardly as clearly shown in the figures. These auxiliary pieces 31 and 32 in conjunction with the adjacent parts of the bottom and back members 27 and 28 of the feeding trough form a constricted throat 33 between the feeding mechanism and the baling chamber wherein the material for baling receives a preliminary compression in advance of its entrance into the baling chamber.

A stripper bar 34 is arranged along the rear top edge of the back 28 and above this extends a wind guard 35.

Figure 3:
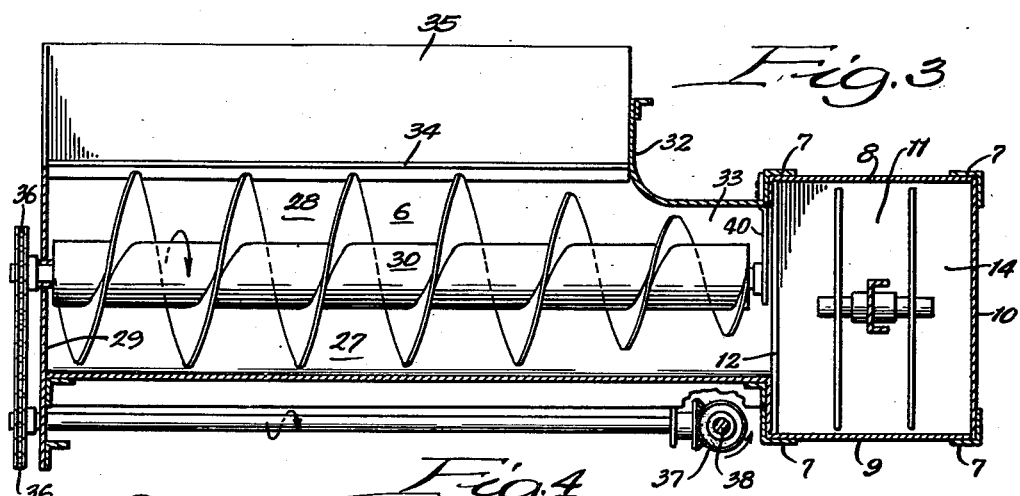
Figure 3 is an enlarged cross-sectional view of the feeding mechanism and baling chamber taken on the line 3—3 of Figure 2.

The spiral member 30 extends longitudinally of the trough into and through the constricted throat section 33, terminating at a point closely adjacent the opening 12 (Fig. 3). The end of the spiral member 30 which is disposed in the constricted throat section 33 is supported from the bale case in such a manner that at least the lower half of the portion of the opening 12 corresponding to the space within the throat 33 swept by the spiral member 30 is substantially clear. In the illustrated structure this is accomplished by providing a vertically extending support bracket 40 which is connected at its upper end to the angle bar 7 and whose lower end rotatably supports the end of the spiral member 30.

As herein shown, the spiral member 30 is journalled at its ends, however, it may be journalled on a long sleeve bearing mounted at the outer end of the trough such as is shown in the Lindgren and Raney Patent No. 2,142,587 which was issued on January 3, 1939.

Figure 4:
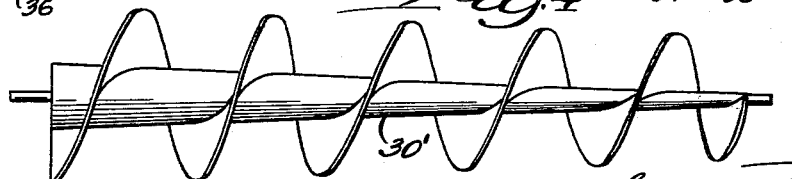
Figure 4 shows a modified form of the spiral member for the feeding mechanism.

In Figs. 1 and 3, the convolutions of the spirally formed member 30 approaching the throat 33 are shown to be of reduced diameter, however, Fig. 4 presents a modified spiral member 30' wherein the core and the flight of the spiral are both tapered throughout their length. The spiral member 30 is driven by a sprocket and chain mechanism 36 which is in turn driven by means of bevel gears 37 (Fig. 3). The bevel gears 37 are driven by a shaft 38 connected to a suitable source of power as indicated at the right hand end of Fig. 1.

The operation of the machine herein described will be more or less apparent. As the machine moves along over the field, the material for baling is picked up by the fingers 22 and delivered under the wind guard 26 to the feeding mechanism 6. From here the material is advanced along the trough into the constricted throat 33 and then through the opening 12 into the baling chamber 11. Each reciprocation of the plunger 14 causes the knife 18 to slice off the material and simultaneously compresses the severed material and advances the previously-compressed sections along the framework toward the end gate 19.

The rotating spiral member 30 advances the material delivered thereto regularly and uniformly in the direction of the baling chamber insuring the delivery to the baling chamber of a substantially equal amount of the material in advance of each reciprocation of the plunger 14. The advancing of the material through the constricted throat 33 effects a preliminary compression just previous to its being delivered to the baling chamber 11.

Changes in the described structure may be made without departing from the spirit of the invention, the scope of which should be determined by reference to the following claims, the same being construed as broadly as possible consistent with the state of the art.

I claim:

1. A baling machine comprising a horizontally disposed elongated baling chamber providing a feed opening in one side thereof for passage of material for baling, a compressing plunger reciprocably mounted in said baling chamber and traversing said opening for compressing material into bales, a forwardly-open receiving trough disposed transversely of said baling chamber, leading to said opening and terminating at its end adjacent said baling chamber in a completely enclosed throat portion substantially corresponding in size to said opening, and a spirally formed member rotatably supported at one end from said receiving trough and at the other end from said baling chamber and extending along said trough and into and substantially through said throat portion, the effective cross sectional area of said throat portion being substantially less than the effective cross sectional area of said trough, and said spirally formed member being of a size to occupy and sweep, when in operation, the major portion of the volume of said enclosed throat portion whereby material being moved by said spirally formed member is preliminarily compressed when it enters said throat portion, and is held compressed until it enters said baling chamber.

2. A baling machine comprising a horizontally disposed elongated baling chamber providing a feed opening in one side thereof for passage of material for baling, a compressing plunger reciprocably mounted in said baling chamber and traversing said opening for compressing material into bales, a forwardly-open receiving trough disposed transversely of said baling chamber, leading to said opening and terminating at its end adjacent said baling chamber in a completely enclosed throat portion substantially corresponding in size to said opening, and a spirally formed member rotatably supported at one end from said trough, said baling chamber having a support, substantially at said opening, rotatably carrying the other end of said spirally formed member, said member extending along said receiving trough and into and substantially through said throat portion to a point adjacent said support, the effective cross sectional area of said throat portion being substantially less than the effective cross sectional area of said trough, whereby material being moved by said spirally formed member is preliminarily compressed when it enters said throat portion, and is held compressed until it enters said baling chamber, and said support being located so as to clear at least the lower half of the space between said spirally formed member and said throat.

3. A baling machine comprising a horizontally disposed elongated baling chamber providing a feed opening in one side thereof for passage of material for baling, a compressing plunger reciprocably mounted in said baling chamber and traversing said opening for compressing material into bales, a forwardly and upwardly open receiving trough disposed transversely of said baling chamber, leading to said opening and terminating at its end adjacent said baling chamber in a completely enclosed throat portion substantially corresponding in size to said opening, and a member rotatably supported at one end from said receiving trough, said baling chamber having a support substantially at said opening, rotatably carrying the other end of said member, and said member extending along said receiving trough and into and substantially through said throat portion, said member including an elongated core portion and a spirally formed flight portion, the effective cross sectional area of said throat portion being substantially less than the effective cross sectional area of said trough, whereby material being moved by said spirally formed flight portion is preliminarily compressed when it enters said throat portion, and is held compressed until it enters said baling chamber, and said support being so located as to substantially clear at least the lower half of the portion of said opening corresponding to the space within said throat swept by said spirally formed flight portion.

STANLEY D. RUSSELL.

REFERENCES CITED

The following references are of record in the file of this patent:

UNITED STATES PATENTS

| Number | Name | Date |
|---|---|---|
| 563,543 | Alter | July 7, 1896 |
| 1,859,586 | Gottschall et al. | May 25, 1932 |
| 2,270,471 | Pilcher et al. | Jan. 20, 1942 |
| 2,294,440 | Barker | Sept. 1, 1942 |
| 2,324,261 | Krause | July 13, 1943 |
| 2,405,688 | Crumb | Aug. 13, 1946 |
| 2,450,082 | Crumb | Sept. 28, 1948 |